UNITED STATES PATENT OFFICE.

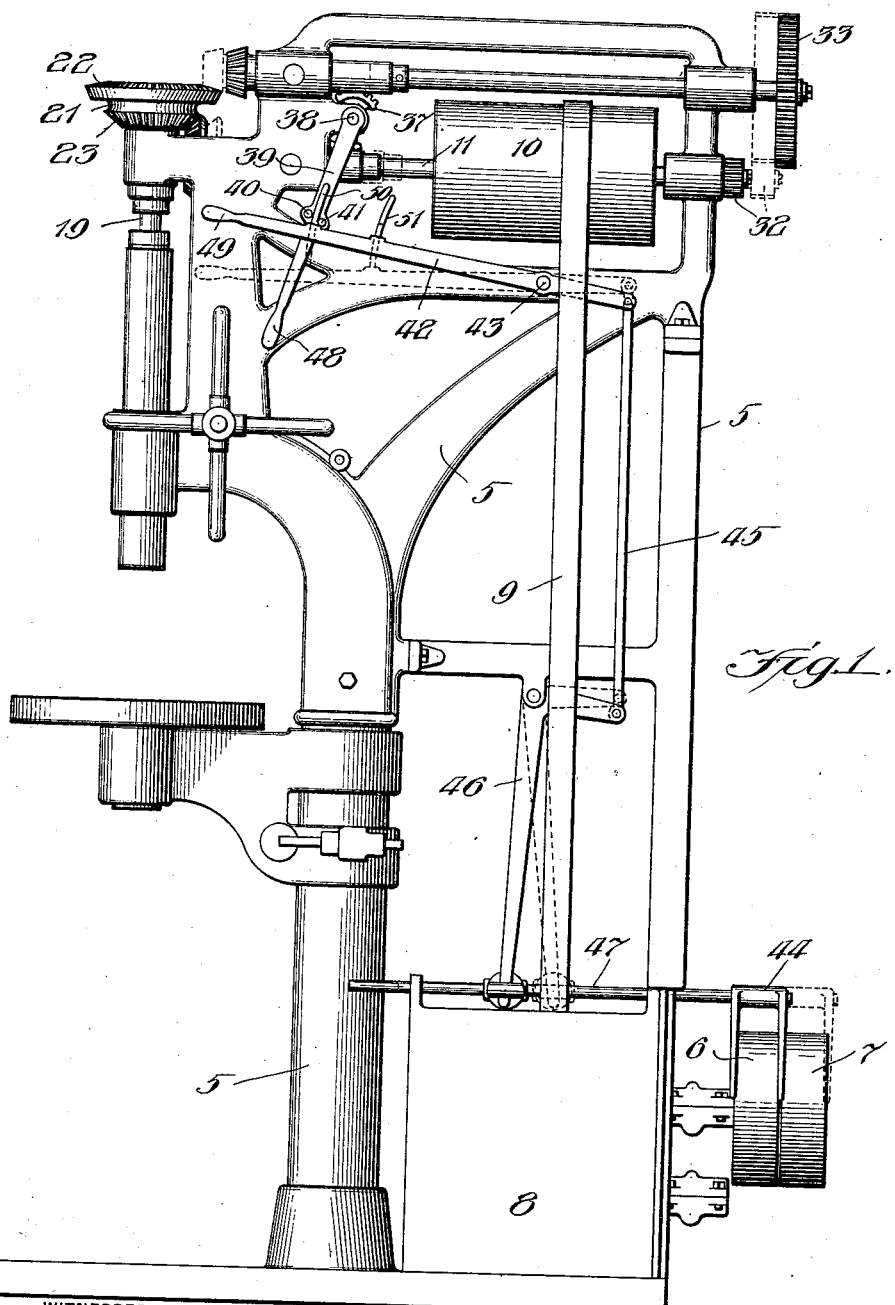

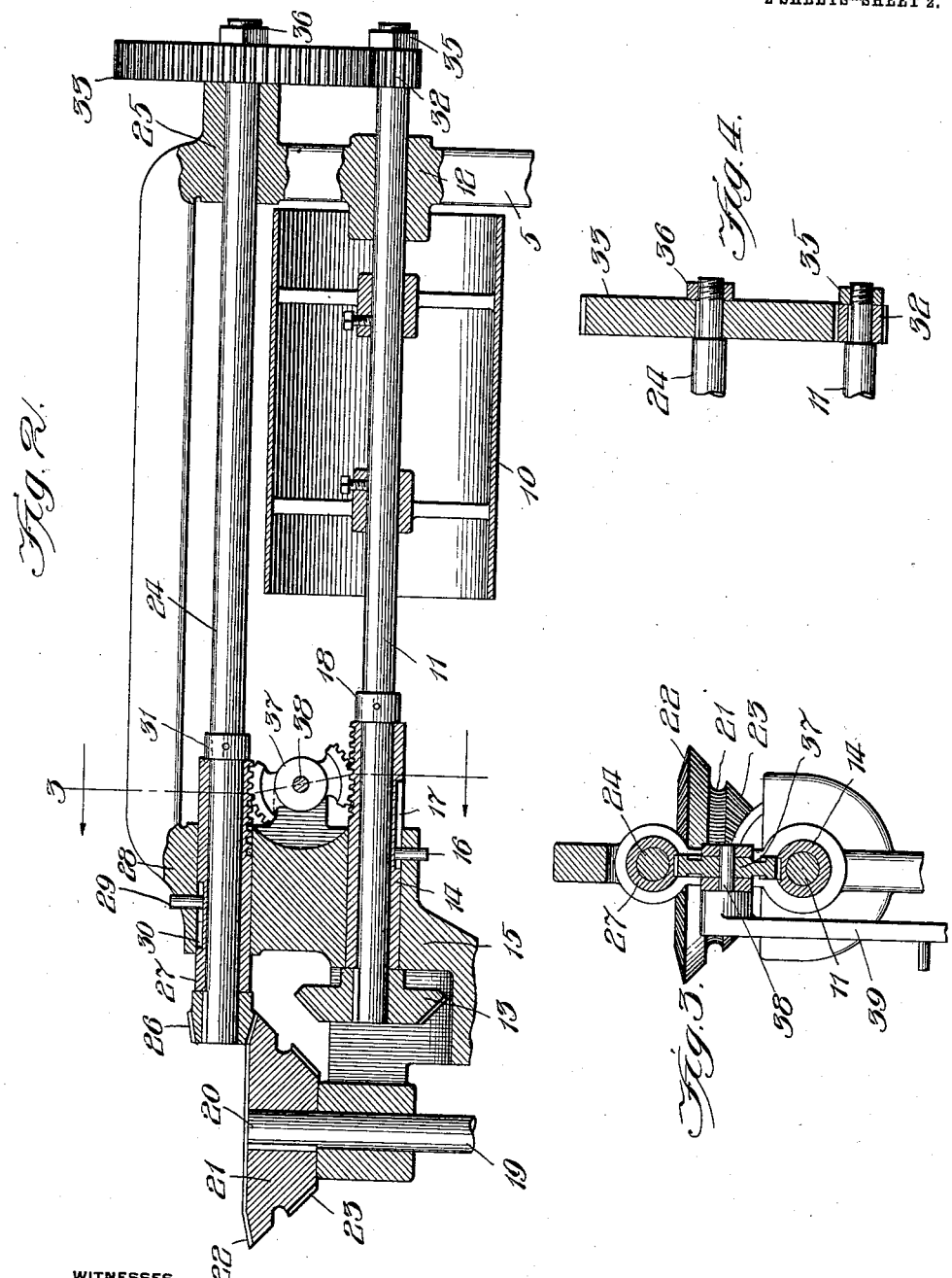

ROBERT MILNE, OF ROCKFORD, ILLINOIS, ASSIGNOR TO ROCKFORD DRILLING MACHINE COMPANY, OF ROCKFORD, ILLINOIS, A CORPORATION OF ILLINOIS.

GEARING FOR DRILL-PRESSES.

1,008,182.  Specification of Letters Patent.  Patented Nov. 7, 1911.

Application filed June 12, 1911. Serial No. 632,661.

*To all whom it may concern:*

Be it known that I, ROBERT MILNE, a citizen of the United States, residing at Rockford, in the county of Winnebago and State of Illinois, have invented certain new and useful Improvements in Gearing for Drill-Presses, of which the following is a specification.

This invention relates to a certain improvement in gearing for drill presses, whereby the speed of rotation of the drill spindle is changed or controlled when such spindle is driven from a shaft rotating at constant speed.

The invention also relates to certain interlocking connections, whereby the power belt must first be thrown off from the driving pulley of the drill before the gearing can be changed, thus removing the danger which has heretofore existed of stripping gears, and obviating the undesirable noise and commotion which usually occurs when changing from one gear ratio to another.

It will be understood at the outset that the ordinary drill press is provided with a main shaft, on which are mounted two pulleys, one being secured to the shaft and the other one being loose thereon. From this main shaft the power is transmitted through suitable gearing to the drill spindle. A belt is usually run from a line or jack shaft to the secured or to the loose pulley, so that by shifting the belt onto the secured pulley the drill press will be driven, while if the belt is shifted onto the loose pulley the latter will rotate freely on the main shaft, and the drill press will not be driven.

In the construction of a drill press, it is customary to provide means for changing the ratio of drive from the main shaft of the same to the drive spindle, and such means may include a cone pulley, or a box of gears, or any other suitable mechanism. In the present case, I do not concern myself particularly with the aforementioned mechanism but provide in addition a back gearing connection which may be used in combination with a cone pulley or a box of gears, as desired. It is preferred, however, that the transmission from the cone pulley or the box of gears to the particular mechanism of the present invention be through the medium of a belt passing over a pulley on the auxiliary shaft, which pulley is of uniform diameter. In this way the maximum power may be transmitted to the drill spindles, regardless of the ratio of drive being used.

One of the principal objects of this invention is to provide a gearing for the drill press, such that the maximum driving force can always be secured, regardless of the ratio between speed rotation of the drill spindle and the main shaft.

Other objects of the invention are: to provide a drill press having a back gearing connection which may be instantaneously thrown into or out of service, so that the drive will be directly to the drill spindle or through the back gearing, as desired, the gear and pinion on the back gearing being removable so that their ratio can be changed from time to time; to provide a construction in which a flat belt pulley may be used, that is, one having a uniform diameter throughout its length, so that the speed change belt can be shifted from position to position with the least amount of difficulty, and so that the maximum amount of belt driving force may always be attained; to provide a lever for throwing the back gear connection into and out of service as desired; to provide a lever for throwing the power belt from the jack shaft onto the loose or the driving pulley of the main shaft as desired; to interlock both of said levers, so that the back gear connection cannot be changed until the power belt has been first thrown onto the loose pulley; to so construct the back gear connection that the drill spindle will be rotated in the same direction, whether the back gear connection be in service or not; and in other ways and manners to generally improve the construction of this type of machine.

Other objects and uses will appear from a detailed description of the invention, which consists in the features of construction and combination of parts hereinafter described and claimed.

Referring now to the drawings, Figure 1 shows a side view of the entire drill press, the back gear connection being thrown out of service, and the belt shifter being thrown into driving position; Fig. 2 shows a cross section through the back gearing mechanism, the back gear being thrown into operative position; Fig. 3 shows a cross section, taken on line 3—3 of Fig. 2, looking in the direction of the arrows; and Fig. 4 shows a cross section through the back gears.

In the embodiment of my invention, I provide an auxiliary shaft and a back gear shaft, substantially parallel to each other and preferably at right angles to the drill spindle. The drill spindle is provided with a pair of bevel gear faces, and the auxiliary shaft and the back gear shaft are each provided with a bevel gear adapted to mesh with the corresponding bevel gear face of the drill spindle. At their rear ends, the auxiliary shaft and the back gear shaft each carry a pinion or gear, which pinion and gear may be meshed together; but the lengths of the shafts are so proportioned that when the back gears are thrown into mesh the bevel gear of the back gear shaft meshes with the drill spindle, but the bevel gear of the auxiliary shaft does not so mesh; while when the bevel gear on the auxiliary shaft meshes with the drill spindle the back gear shaft will be thrown into inoperative position. Means are then provided for shifting both the auxiliary shaft and the back gear shaft longitudinally, in opposite directions however, so that proper gear meshings will be secured when the shafts are in either position. This shifting mechanism preferably includes a hand lever. A suitable lever connection is provided for throwing the driving belt onto the driving or loose pulley as desired, and this lever in turn is interlocked with the lever for the back gear connection as aforesaid.

Referring now to the drawings, the frame of the drill press is designated by the numeral 5. In its lower portion it is provided with a main shaft, on which are mounted a fixed or driving pulley 6 and a loose pulley 7. The belt from the jack shaft passes over one or the other of these pulleys. Any suitable speed change gearing 8 is provided and a change speed belt 9 passes from the gearing 8 over a pulley 10 on the auxiliary shaft. The pulley 10 is mounted on an auxiliary shaft 11, which is journaled in the frame of the drill press at the point 12, and which carries a bevel gear 13 at its other end. At the bevel gear end it carries a rack sleeve 14, which is supported in the frame of the drill press at the point 15, and is prevented from rotation by a pin 16, which engages a longitudinal groove 17 in the sleeve. A collar 18 on the shaft insures that the shaft will move back and forth in accordance with the movements of the sleeve 14.

The drill spindle shaft is designated by the numeral 19. At its upper end 20 it carries a combined bevel gear 21, having an upper gear face 22 and a lower gear face 23. This lower gear face is adapted to mesh with the bevel gear 13 on the auxiliary shaft, and the two gears are preferably of equal diameter, so that a ratio of one to one is secured from the auxiliary shaft to the drill spindle shaft 19 when these gears are in mesh.

A back gear shaft 24, preferably parallel to the auxiliary shaft 11, is journaled in the frame of the press at the point 25, and at its other end carries a bevel pinion 26. Adjacent to this pinion it carries a rack sleeve 27, slidably mounted in the frame of the press at the point 28, and prevented from rotation by a pin 29, which engages a groove 30. A collar 31 insures that the back gear shaft will move back and forth in accordance with the movements of the sleeve 27. The bevel pinion 26 is adapted to mesh with the gear face 22, and it is preferably of fewer teeth than the same, so that a considerable speed reduction is obtained when the bevel pinion is meshing with the bevel gear.

A pinion 32 is removably mounted on the rear end of the auxiliary shaft 11, and a gear 33 is removably mounted on the rear end of the back gear shaft 24, nuts 35 and 36 holding this pinion and gear in position on their respective shafts.

A segmental gear 37, mounted on a shaft 38, is adapted to engage the rack faces of the sleeves 14 and 27, so that by rotating said shaft 38 the auxiliary shaft will be thrown in one direction and the back gear shaft in the other direction, or vice-versa. When the elements are thrown into the position illustrated in Fig. 1, the bevel gear 13 of the auxiliary shaft will directly drive the drill spindle shaft, the bevel pinion 26 of the back gear shaft being in inoperative position, and the pinion 32 being out of mesh with the gear 33. On the other hand, when the shaft 38 is rotated, so as to throw the auxiliary and back gear shafts into the position shown in Fig. 2, the bevel gear 13 will be withdrawn from the bevel gear of the drill spindle shaft, the bevel pinion 26 of the back gear shaft will mesh with the bevel gear of the drill spindle shaft, and the pinion 32 will mesh with the gear 33. An examination of the relative meshings of the gears and pinions will show that when the elements are in either of the aforementioned positions, the drill spindle shaft will rotate in the same direction, provided that the pulley 10 continues to rotate in the same direction. Obviously, a change of drill spindle speed is instantaneously secured by rotating the shaft 38 in one direction or the other, and this change of speed will always be of the same ratio, provided the pinion 32 and the gear 33 are not changed. However, it is manifest that by changing the ratio of the pinion 32 and the gear 33, a still further change of ratio can be secured, and to this end the pinion 32 and the gear 33 are removably mounted on their respective shafts, as illustrated in Fig. 4.

Referring again to Fig. 1, the shaft 38 carries a lever arm 39, which is provided with a pair of pins 40 and 41. A lever arm 42, pivoted at the point 43, controls the back and forth movements of a belt shifter 44 through the medium of a link 45, bell crank 46, and rod 47. The handles 48 and 49 of the levers 39 and 42, respectively, are placed in close proximity so that they can be easily manipulated. The lever 42 carries a pair of fingers 50 and 51, respectively, either one of which may be thrown up between the pins 40 and 41. When this has been done the lever 39 cannot be swung to throw the back gearing into or out of commission, and in fact the lever cannot be swung at all until the lever 42 has been thrown down into the dotted line position so as to throw the belt shifter over into its dotted line position, thus carrying the belt onto the loose pulley 7. When the belt has been thrown over onto the loose pulley, the lever arm 42 being in the dotted line position, the lever 39 may be swung over to throw in the back gearing connection, and then power may be applied by raising the arm 42 and thus shifting the belt back onto the power pulley 6. It is thus seen that the movements of the back gearing connection and the belt shifter are perfectly interlocked, thus largely reducing the danger of stripping gears, creating an undesirable noise, etc.

Of course, it will be understood that the back gearing connection, which is one of the features to which the present invention relates, may be used in combination with any form of speed control desired, whether it be a set of cone pulleys, or a box of gears as illustrated in the drawings of the present invention. By the use of a speed control mechanism such as a box of gears, any one of, say, five speeds may be obtained when directly driving from the auxiliary shaft to the drill spindle, and any one of five other speeds may be obtained when driving through the back gearing connection. This would make it possible to obtain ten speeds without changing the pinion 32 and the gear 33. By reason of the fact that the pinion and gear are removably attached to their respective shafts, it is evident that the operator may obtain other gear ratios between the auxiliary and the back gearing shafts, so that still other speeds may be obtained when desired.

The feature of interlocking the movements of the back gear connection with the movements of the belt shifter is very important and desirable, because it insures that the operator will always throw off the power from the drill press before he can change the back gearing connection. This being the case, the machine will come practically to rest before he can manipulate the lever 39 to change the back gearing connection.

I claim:

1. The combination with a rotatable member, of a longitudinally movable auxiliary shaft, a longitudinally movable back gearing shaft, means for driving the rotatable member from the auxiliary shaft when said shaft is in one longitudinal position, means for driving the rotatable member from the back gearing shaft when said shaft is in one longitudinal position, and means for driving the back gearing shaft from the auxiliary shaft when the back gearing shaft is in the aforementioned longitudinal position, substantially as described.

2. The combination with a rotatable member, of a longitudinally movable auxiliary shaft, a longitudinally movable back gearing shaft, means for driving the rotatable member from the auxiliary shaft when said shaft is in one longitudinal position, means for driving the rotatable member from the back gearing shaft when said shaft is in one longitudinal position, and means for driving the back gearing shaft from the auxiliary shaft when the back gearing shaft is in the aforementioned longitudinal position, and the auxiliary shaft is in another longitudinal position, substantially as described.

3. The combination with a rotatable member of a pair of bevel gears on the same, a longitudinally movable auxiliary shaft, a bevel gear on the same adapted to mesh with one of the bevel gears of the rotatable member when the auxiliary shaft is in one longitudinal position, a back gearing shaft, a bevel gear on the same adapted to mesh with one of the bevel gears of the rotatable member when the back gearing shaft is in one longitudinal position, and means for driving the back gearing shaft from the auxiliary shaft, substantially as described.

4. The combination with a rotatable member, of a pair of bevel gears on the same, a longitudinally movable auxiliary shaft, a bevel gear on the same adapted to mesh with one of the bevel gears of the rotatable member when the auxiliary shaft is in one longitudinal position, a back gearing shaft, a bevel gear on the same adapted to mesh with one of the bevel gears of the rotatable member when the back gearing shaft is in one longitudinal position, and means for driving the back gearing shaft from the auxiliary shaft when the back gearing shaft is in the aforementioned longitudinal position, and the auxiliary shaft is in another longitudinal position, substantially as described.

5. The combination with a rotatable member, of a pair of bevel gears on the same, a longitudinally movable auxiliary shaft, a bevel gear on the same adapted to mesh with a bevel gear of the rotatable member when the auxiliary shaft is in one position, a back gearing shaft, a bevel gear on the same adapted to mesh with a bevel gear of the rotatable member when the back gearing shaft is in one longitudinal position, means for shifting both of said shafts longitudinally, and a back gearing connection between said shafts when the bevel gear of the back gearing shaft is in engagement with a bevel gear of the rotatable member, and the bevel gear of the auxiliary shaft is disengaged from a bevel gear of the rotatable member, substantially as described.

6. The combination with a rotatable member, of a pair of bevel gears on the same, a longitudinally movable auxiliary shaft, a bevel gear on the same adapted to mesh with a bevel gear of the rotatable member when the auxiliary shaft is in one position, a back gearing shaft, a bevel gear on the same adapted to mesh with a bevel gear of the rotatable member when the back gearing shaft is in one longitudinal position, means for shifting both of said shafts longitudinally in opposite directions at the same time, and a back gearing connection between said shafts when the bevel gear of the gearing shaft is in engagement with a bevel gear of the rotatable member, and the bevel gear of the auxiliary shaft is disengaged from a bevel gear of the rotatable member, substantially as described.

7. The combination with a rotatable member, of a pair of bevel gears on the same, a longitudinally movable auxiliary shaft, a bevel gear on the same adapted to mesh with a bevel gear of the rotatable member when the auxiliary shaft is in one longitudinal position, a gear on the rear end of the auxiliary shaft, a longitudinally movable back gearing shaft, a bevel gear on the same adapted to mesh with a bevel gear of the rotatable member when the back gearing shaft is in one longitudinal position, and a gear on the rear end of the back gearing shaft adapted to mesh with the gear on the rear end of the auxiliary shaft, substantially as described.

8. The combination with a rotatable member, of a pair of bevel gears on the same, a longitudinally movable auxiliary shaft, a bevel gear on the same adapted to mesh with a bevel gear of the rotatable member when the auxiliary shaft is in one longitudinal position, a gear on the rear end of the auxiliary shaft, a longitudinally movable back gearing shaft, a bevel gear on the same adapted to mesh with a bevel gear of the rotatable member when the back gearing shaft is in one longitudinal position, a gear on the rear end of the back gearing shaft, and means for shifting both of said shafts longitudinally in opposite directions at the same time, substantially as described.

9. The combination with a rotatable member, of a pair of bevel gears on the same, a longitudinally movable auxiliary shaft, a bevel gear on one end of the same adapted to mesh with a bevel gear on the rotatable member, a gear on the rear end of said shaft, a longitudinally movable back gearing shaft, a bevel gear on the same adapted to mesh with a bevel gear of the rotatable member, a gear on the rear end of said shaft adapted to mesh with the gear on the rear end of the auxiliary shaft, and a lever connection for shifting both of said shafts longitudinally, substantially as described.

10. The combination with a rotatable member, of a pair of bevel gears on the same, a longitudinally movable auxiliary shaft, a bevel gear on one end of the same adapted to mesh with a bevel gear of the rotatable member, a gear on the rear end of said shaft, a longitudinally movable back gearing shaft, a bevel gear on the same adapted to mesh with a bevel gear of the rotatable member, a gear on the rear end of said shaft adapted to mesh with the gear on the rear end of the auxiliary shaft, and a lever connection for shifting both of said shafts longitudinally in opposite directions at the same time, substantially as described.

11. The combination with a rotatable member, of a longitudinally movable auxiliary shaft, means for driving the rotatable member from the auxiliary shaft when said shaft is in one longitudinal position, a longitudinally movable back gearing shaft, means for driving the rotatable member from the back gearing shaft when the same is in one position, means for shifting both of said shafts longitudinally in opposite directions at the same time, and means for driving the back gearing shaft from the auxiliary shaft when the back gearing shaft is in driving connection with the rotatable member, substantially as described.

12. The combination with a rotatable member, of a longitudinally movable auxiliary shaft, means for driving the rotatable member from the auxiliary shaft when the same is in one position, a longitudinally movable back gearing shaft, means for driving the rotatable member from the back gearing shaft when the same is in one position, a rack collar on each of said shafts, a segmental gear engaging both of the racks of said collars, means for rotating said segmental gear to shift both of the shafts at the same time, and means for driving the back gearing shaft from the auxiliary shaft when the back gearing shaft is in driving connection with the rotatable member, substantially as described.

13. The combination with a rotatable member, of a longitudinally movable auxiliary shaft, means for driving the rotatable member from the auxiliary shaft when the same is in one position, a longitudinally movable back gearing shaft, means for driving the rotatable member from the back gearing shaft when the same is in one position, a rack collar on each of said shafts, a gear engaging both of the racks of said collars, means for rotating said gear to shift both of the shafts in opposite directions at the same time, and means for driving the back gearing shaft from the auxiliary shaft when the back gearing shaft is in driving connection with the rotatable member, substantially as described.

14. The combination with a rotatable member and mechanism for controlling power, of a longitudinally movable auxiliary shaft, means for driving the rotatable member from the auxiliary shaft when the same is in one longitudinal position, a longitudinally movable back gearing shaft, means for driving the rotatable member from the back gearing shaft when the same is in one longitudinal position, means for shifting both of said shafts longitudinally, means for shifting the power controlling mechanism, and an interlocking connection between the shifting means of the power controlling mechanism and the shaft shifting means, whereby the shafts cannot be shifted longitudinally when power is applied to the auxiliary shaft, substantially as described.

15. The combination with a rotatable member and mechanism for controlling power, of a longitudinally movable auxiliary shaft, means for driving the rotatable member from the auxiliary shaft when the same is in one longitudinal position, a longitudinally movable back gearing shaft, means for driving the rotatable member from the back gearing shaft when the same is in one longitudinal position, means for shifting both of said shafts longitudinally in opposite directions at the same time, means for shifting the power controlling mechanism, and an interlocking connection between the shifting means of the power controlling mechanism and the shaft shifting means, whereby the shafts cannot be shifted longitudinally when power is applied to the auxiliary shaft, substantially as described.

16. The combination with a rotatable member, and mechanism for controlling power, of a longitudinally movable auxiliary shaft, means for driving the rotatable member from the auxiliary shaft when the same is in one longitudinal position, a longitudinally movable back gearing shaft, means for driving the rotatable member from the back gearing shaft when the same is in one longitudinal position, means for shifting both of said shafts longitudinally in opposite directions at the same time, means for driving the back gearing shaft from the auxiliary shaft when the back gearing shaft is in driving connection with the rotatable member, means for shifting the power controlling mechanism, and an interlocking connection between the shifting means and the shaft shifting means of the power controlling mechanism, whereby the shafts cannot be shifted longitudinally when power is applied to the auxiliary shaft, substantially as described.

17. The combination with a rotatable member and mechanism for controlling power, of a longitudinally movable auxiliary shaft, means for driving the rotatable member from the auxiliary shaft when the same is in one longitudinal position, a longitudinally movable back gearing shaft, means for driving the rotatable member from the back gearing shaft when the same is in one longitudinal position, a lever for shifting both of said shafts longitudinally, a lever for shifting the power controlling mechanism, and an interlocking connection between both of said levers, whereby the shafts cannot be shifted longitudinally while power is applied to the auxiliary shaft, substantially as described.

18. The combination with a rotatable member and mechanism for controlling power, of a longitudinally movable auxiliary shaft, means for driving the rotatable member from the auxiliary shaft when the same is in one longitudinal position, a longitudinally movable back gearing shaft, means for driving the rotatable member from the back gearing shaft when the same is in one longitudinal position, a lever for shifting both of said shafts longitudinally in opposite directions at the same time, means for driving the back gearing shaft from the auxiliary shaft when the back gearing is in driving connection with the rotatable member, a lever for shifting the power controlling mechanism, and an interlocking connection between both of said levers, whereby the shafts cannot be shifted longitudinally while power is applied to the auxiliary shaft, substantially as described.

19. The combination with a rotatable member, of a longitudinally movable auxiliary shaft, a longitudinally movable back gearing shaft substantially parallel to the same, means for driving the rotatable member from the auxiliary shaft when the same is in one position, means for driving the rotatable member from the back gearing shaft when the same is in one position, a back gearing connection from the auxiliary shaft to the back gearing shaft when the back gearing shaft is in driving connection with the rotatable member, and means for shifting both of said shafts longitudinally in opposite directions at the same time, substantially as described.

ROBERT MILNE.

Witnesses:
SAMUEL H. RECK,
H. LEECH.

Copies of this patent may be obtained for five cents each, by addressing the "Commissioner of Patents, Washington, D. C."